United States Patent [19]
Hudson et al.

[11] Patent Number: 5,610,610
[45] Date of Patent: Mar. 11, 1997

[54] INVERSE SYNTHETIC ARRAY RADAR SYSTEM AND METHOD

[75] Inventors: Ralph E. Hudson; Howard S. Nussbaum, both of Los Angeles; Ernest Chen, San Pedro, all of Calif.

[73] Assignee: Hughes Electronics, Los Angeles, Calif.

[21] Appl. No.: 195,555

[22] Filed: May 18, 1988

[51] Int. Cl.$^6$ ........................................ G01S 13/90
[52] U.S. Cl. ........................................ 342/25
[58] Field of Search ................................ 342/25

[56] References Cited

U.S. PATENT DOCUMENTS

| | | | |
|---|---|---|---|
| H1,181 | 5/1993 | Rihaczek | 342/25 |
| 3,913,099 | 10/1975 | Wehner et al. | 342/192 |
| 4,034,370 | 7/1977 | Mims | 342/25 |
| 4,170,006 | 10/1979 | Falk | 342/25 |
| 4,191,957 | 3/1980 | Walker et al. | 342/25 X |
| 4,387,373 | 6/1983 | Longuemare, Jr. | 342/25 |
| 4,450,444 | 5/1984 | Wehner et al. | 342/25 |
| 4,527,161 | 7/1985 | Wehner | 342/152 |
| 4,538,149 | 8/1985 | Wehner | 342/25 |
| 4,546,355 | 10/1985 | Boles | 342/179 |
| 4,547,775 | 10/1985 | Wehner et al. | 342/201 |
| 4,603,331 | 7/1986 | Wehner | 342/192 |
| 4,706,088 | 11/1987 | Weindling | 342/25 |
| 4,706,089 | 11/1987 | Weindling | 342/25 |
| 4,724,418 | 2/1988 | Weindling | 342/25 |
| 4,985,704 | 1/1991 | Smith | 342/25 |
| 5,281,971 | 1/1994 | Moulton | 342/13 |
| 5,289,188 | 2/1994 | Chudleigh, Jr. | 342/158 |
| 5,489,906 | 2/1996 | McCord | 342/25 |

*Primary Examiner*—John B. Sotomayor
*Attorney, Agent, or Firm*—Leonard A. Alkov; Wanda K. Denson-Low

[57] ABSTRACT

An inverse synthetic array radar (ISAR) system provides for improving the resolution of an ISAR image by providing compensation for non-uniformity in the magnitude of the angular velocity of a rotating target as the target rotates to generate the synthetic-aperture-angle, and enables use of a larger synthetic-aperture angle, without compromising ISAR image quality with respect to smear. The preferred embodiment records sampled data signals to generate a collected-data matrix indexed in each of two dimensions on the basis of uniform increments of time, and performs data processing to produce a translated data matrix indexed in a dimension on the basis of uniform increments of synthetic-aperture angle. Further processing of the translated data matrix produces data in a buffer for controlling a display device for the ISAR image.

16 Claims, 6 Drawing Sheets

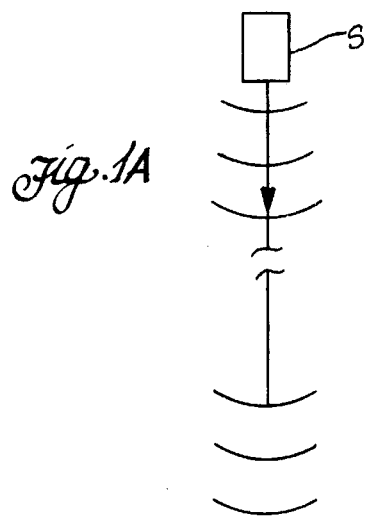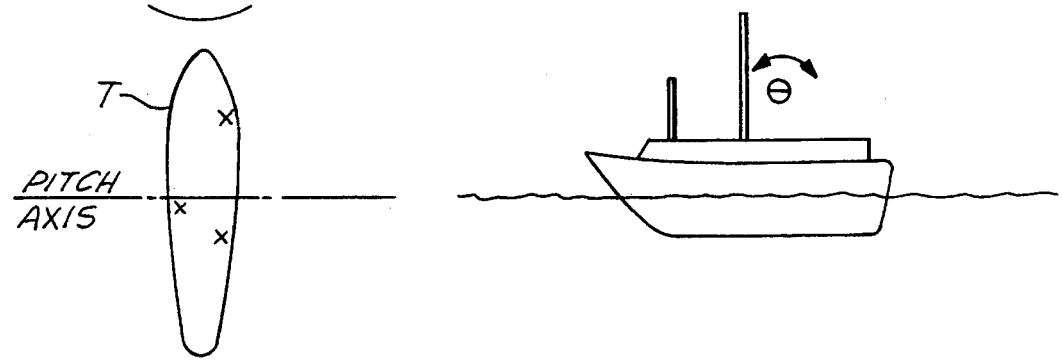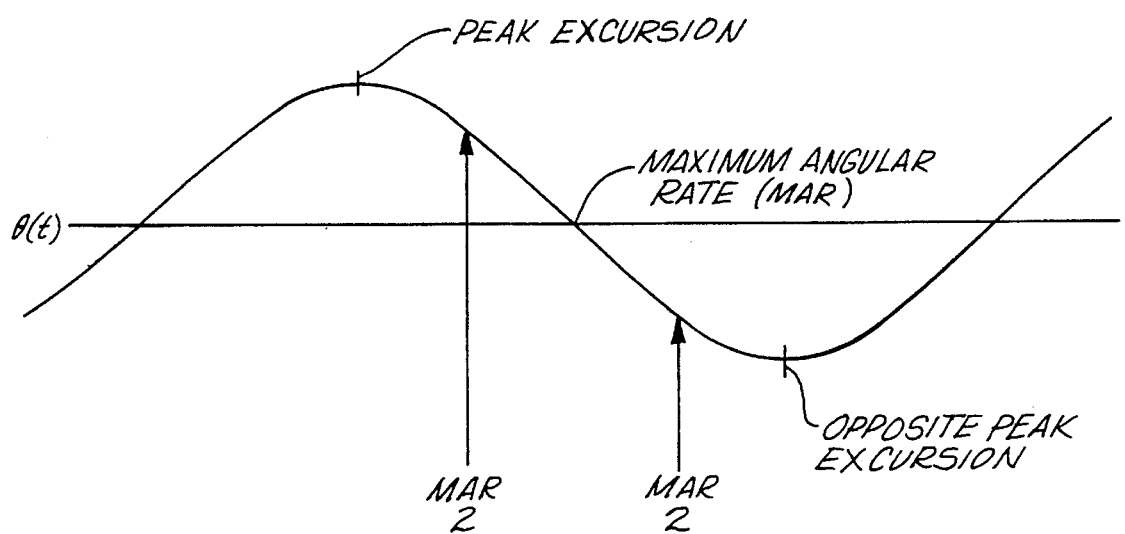

Fig. 4

|    | RB1     | RB2 |   | RBN |
|----|---------|-----|---|-----|
| P1 | SI1/SQ1 |     |   |     |
| P2 |         |     |   |     |
| P3 |         |     |   |     |
| P4 |         |     |   |     |
| P5 |         |     |   |     |
| Pi |         |     |   |     |
| Pm |         |     |   |     |

COLLECTED-DATA MATRIX 30

Fig. 5

| RB1  | RB2  |   | RBN  |
|------|------|---|------|
| W(1) | W(2) | — | W(N) |

VARIANCE ARRAY 53

Fig. 6

|    | S1        | S2        | S12         |
|----|-----------|-----------|-------------|
| P1 | φ(S1,1)   | φ(S2,1)   | φ(S12,1)    |
| P2 | φ(S1,2)   | φ(S2,2)   | φ(S12,2)    |
| Pm | φ(S1,m)   | φ(S1,m)   | φ(S12,m)    |

INITIALLY-GENERATED UNWRAPPED-PHASE-HISTORY MATRIX 45

Fig. 7

MODIFIED UNWRAPPED PHASE-HISTORY MATRIX 45M

| | S1 | | S12 |
|---|---|---|---|
| P1 | $d(S1)\theta(1)$ | ------- | $d(S12)\theta(1)$ |
| P2 | $d(S1)\theta(2)$ | ------- | |
| ⋮ | | | |
| Pm | $d(S1)\theta(m)$ | ------- | $d(S12)\theta(m)$ |

Fig. 8

COVARIANCE MATRIX 47

| $C(1,1)$ | ----------- | $C(1,12)$ |
|---|---|---|
| | | |
| $C(12,1)$ | ----------- | $C(12,12)$ |

Fig. 9

EIGENVECTOR RECORD 49

| $d(1)$ | $d(2)$ | --------- | $d(12)$ |

INVERSE SYNTHETIC ARRAY RADAR SYSTEM AND METHOD

BACKGROUND OF THE INVENTION

1. Field of the Invention

This invention relates to inverse synthetic array radar (ISAR); more particularly, it relates to an ISAR system and method for improving the resolution of an ISAR image by providing compensation for non-uniformity in the magnitude of the angular velocity of a rotating target as the target rotates to generate the synthetic-aperture-angle.

A target ship moving in pitch can take many seconds, e.g., more than five seconds, in the course of rotating between the point at which its bow is deepest in the water to the opposite point at which the bow is up. At each such opposite end of a half pitch cycle, the magnitude of the pitch component of the ship's angular velocity is zero. At some point near the midpoint, the magnitude has a maximum value.

As a result of such non-uniformity in the magnitude of the angular velocity, a given scatterer causes a non-uniform or time-varying doppler shift in the radar pulses it reflects.

2. Description of the Prior Art

Prior art ISAR systems have been organized to provide short, overlapping processing intervals in an effort to deal with the problems arising from non-uniformity in the magnitude of the angular velocity of a rotating target.

Such a "short" processing interval constitutes an interval short enough to be consistent with the angular motion of the target remaining constant, (i.e., within narrow limits) throughout the processing interval. If the angular motion remains constant throughout the processing interval, a given scatterer will produce a doppler shift that remains constant throughout the processing interval. In other words, a scatterer will not drift from one doppler filter to the next if the processing interval is short enough. Because of the use of such short processing intervals, images produced by such prior art ISAR systems have less smear than would otherwise result from scatterer drift. However, this advantage of reduced smear has been gained as a compromise that entails a countervailing disadvantage of loss of resolution.

A substantial need has existed for an improved ISAR system and method to provide better resolution so that more detailed and more easily interpreted ISAR images can be displayed, and to provide such better resolution without sacrificing performance in another important respect such as performances in preventing excessive smear.

This substantial need has been a longstanding one, and has received extensive attention for numerous reasons including the widely recognized desirability of improving resolution.

SUMMARY OF THE INVENTION

This invention provides an improved ISAR system and method. It deals with the problems arising from non-uniformity in the magnitude of target angular velocity, and does so in accord with a substantially different approach from the prior art approach involving short, overlapping processing intervals. In contrast to the prior art approach and its attendant disadvantage with respect to resolution, this invention provides for compensating for the non-uniformity in the magnitude of target angular velocity, and by doing so provides for improved resolution. Stating the foregoing in somewhat different terms, the invention can be said to enable use of a larger synthetic-aperture angle, and yet not compromise ISAR image quality with respect to smear.

In terms of apparatus, the invention can be defined as an ISAR system that is organized to compensate for non-uniformity in the magnitude of the angular velocity of a rotating target as the target rotates to generate the synthetic-aperture angle. The system comprises numerous cooperating elements including transmitter means and receiver means. The transmitter means transmits a sequence of radar pulses toward the target during a data collection interval, and the receiver means produces in-phase and quadrature-phase signals based on radar returns from the target. The transmitter means can be arranged in a conventional way to provide coherent radar pulses. An alternative well-known technique involving coherent-on-receive signal reception is also suitable to enable the radar transmitter and receiver to cooperate to result in the production of the in-phase and quadrature-phase signals.

The system further includes signal converter means for converting the in-phase signals and quadrature-phase signals to sampled digital signals. As is well known, such sampling in an ISAR system defines a succession of range bins after each radar pulse is transmitted.

The system further includes data recording means for using the sampled data signals to generate a collected-data matrix indexed in each of two dimensions on the basis of regular, preferably uniform, increments of time. Such regular increments are preferably uniform within one dimension corresponding to a succession of uniformly wide range bins, and are preferably uniform within a second dimension corresponding to a succession of radar pulses at a constant pulse repetition frequency (PRF). Preferably, the data recording means includes a memory and memory accessing means with the memory providing a multiplicity of matrix cells, each of which is allocated to store both a sampled in-phase signal and a sampled quadrature-phase signal.

Latent (i.e., not explicit) in each such pair of sampled signals is information about a phase-residue value. Such phase-residue value, if and when computed, is unambiguous only within limits set by a modulo basis of computation. In other words, the same residue value of 1°, for example, corresponds ambiguously to each of a succession of phase relative values—1°, 361°, 721°, etc. concerning the phase of the received signal, relative to any given arbitrarily selected reference phase, during the range bin within the reception interval in which the received signal was sampled.

In accord with a novel and highly advantageous arrangement, a system embodying this invention includes first and second data processing means that cooperate to produce a translated data matrix indexed in a dimension on the basis of regular increments of synthetic-aperture angle. The first data processing means processes the collected-data matrix to produce a synthetic-aperture-angle record indexed on the basis of regular increments of time, and the second data processing means uses the collected-data matrix and the synthetic-aperture-angle record to produce the translated data matrix.

The system further includes display means and third data processing means for using the translated data matrix to control the display means to generate an image of the target.

Because the overall synthetic-aperture-angle need not be limited as in the prior art approach of using short processing intervals, the third processing means can suitably index the translated data matrix in a dimension on the basis of uniform increments of synthetic aperture, providing remarkably detailed resolution.

In the preferred embodiment, the first data processing means includes means for selecting from the collected-data matrix a sub-matrix by identifying a group of consecutive pulse-identifying integers together with a group of non-consecutive range-bin-identifying integers, and further includes means for processing the selected sub-matrix to produce an unwrapped phase history for each selected range-bin, and means for processing the unwrapped phase histories to produce the synthetic-aperture-angle record.

Such sub-matrix selection has multiple advantages. Processing of data in the sub-matrix of course entails less of a processing load than processing of data in the entire collected-data matrix. In this connection, an ISAR system embodying this invention operates at a PRF that, during the data collection interval, results in an enormous quantity of data. For example, by operating at a PRF of 1 kilohertz (KHz), and at a sampling rate defining 500 range bins within each receive interval, over a period of 10 seconds, the system will generate a collected-data matrix comprising 5 million matrix cells, each containing a pair of sampled signals. Unwrapping the phase histories for all 500 range cells throughout the 10,000 pulses would present an enormous processing load. Furthermore, and more significantly, such range-bin selection provides an important advantage with respect to information content. In this connection, many of the range bins contain data affected by multiple scatterers. A relatively smaller number of range bins each contain data affected by a single dominant scatterer. Selecting such range bins, and unwrapping the phase histories for each of them enhances not only the speed but also the quality of performance of the system. In the preferred embodiment, the selection is accomplished by first selecting an arbitrary interval defined by a group of consecutive pulse integers; determining the variance, by range bin, within the arbitrary interval; comparing the variance for each range bin against its neighbors to identify a smaller group that in no case has a higher variance than either of its neighbors; and then selecting a smaller group, suitably 12, that have the lowest variances.

As to the unwrapped-phase-histories, in the preferred embodiment, means in the first data processing means determines, for each range bin in the selected sub-matrix, a phase-difference value between each consecutive pair of sampled signals in such range bin, and uses such phase-difference values in generating an unwrapped-phase-history matrix in the memory.

The unwrapped-phase-history matrix, as initially generated in operation of the preferred embodiment, contains data that is subject to processing to yield the synthetic-aperture-angle record. The preferred embodiment performs such processing by first modifying the initially-generated phase-history matrix to produce data that in each modified matrix cell depends on the product of an off-focus-distance value (by scatterer or, equivalently, by range bin) and a synthetic-aperture-angle value (by pulse-identifying integer).

In accord with a highly advantageous feature of the preferred embodiment, means are provided to generate a covariance matrix and to produce an eigenvector defining the distance values, and to use each such distance value to produce the synthetic-aperture-angle record.

It will be appreciated from the foregoing summary setting out the organization of a system embodying the invention, and setting out some of the features of its preferred embodiment, that the invention can also be defined in terms of a method. Further, additional features of the preferred embodiment of the invention are described in detail below and are recited in the appended claims.

BRIEF DESCRIPTION OF THE DRAWINGS

FIG. 1 is a group of sketches comprising FIGS. 1A–1C illustrating a representative target ship in relation to an ISAR system, and illustrating in graphical form the angular motion of the target ship about an axis perpendicular to the line of sight of the radar;

FIGS. 4–11 are sketches, each illustrating the logical arrangement in memory of data-storing cells, and the contents of such cells, as a result of operations carried out by the system of FIG. 2, wherein FIG. 4 illustrates a collected-data matrix;

FIG. 5 illustrates a variance array;

FIG. 6 illustrates an unmodified unwrapped-phase-history matrix;

FIG. 7 illustrates a modified unwrapped-phase-history matrix;

FIG. 8 illustrates a covariance matrix;

FIG. 9 illustrates an eigenvector record;

FIG. 10 illustrates a synthetic-aperture-angle record; and

FIG. 11 illustrates a translated matrix.

DETAILED DESCRIPTION

Figure 2:
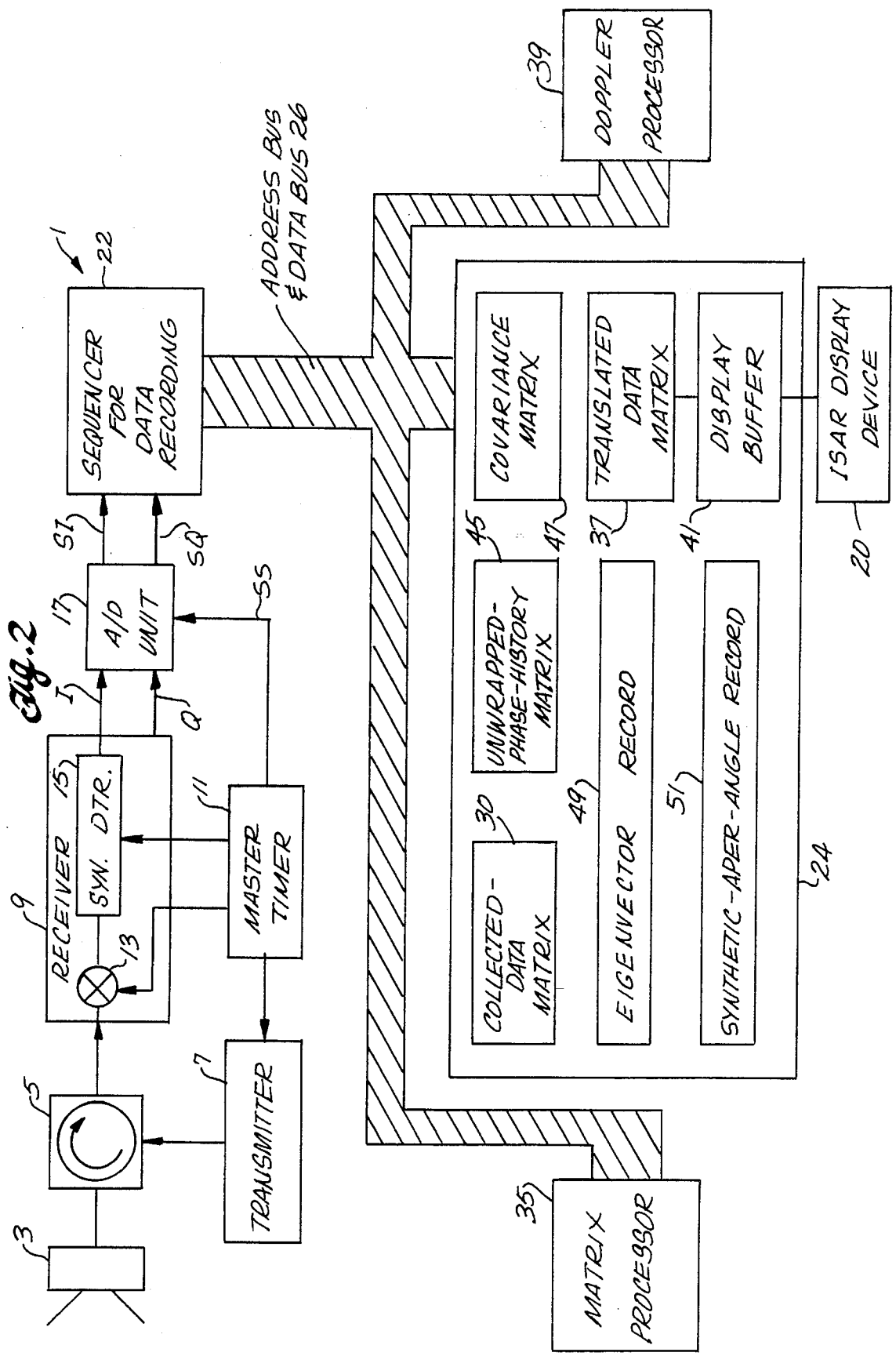
FIG. 2 is a block diagram of an ISAR system organized in accord with this invention.

To lay a foundation for a detailed description of the construction and operation of an embodiment of this invention, there will first be described with reference to FIG. 1 a representative situation in which an inverse synthetic array radar (ISAR) system is used. As indicated in the sketch of FIG. 1A, an ISAR system (S) transmits radar pulses toward a target (T) such as a floating ship, and receives returns caused by scatterers on the target. Signal and data processing of such return signals, involving range-bin and doppler-frequency resolution processing, is carried out by the system S to generate and display an image of the target.

Whereas a synthetic array radar (SAR) system synthesizes a long array antenna as the craft carrying the SAR system moves relative to an area to be mapped, the craft carrying the ISAR system need not move relative to the target centroid to generate an ISAR image. Instead, the operation of the ISAR system depends upon the target undergoing rotation, as seen by the radar. Such rotation may be yaw, pitch, or roll rotation, or some combination thereof.

To simplify description and to subordinate details with respect to more basic matters, the ISAR system (S) in FIG. 1 is shown directly in front of the bow of the target ship (T) and the antenna boresight line is aligned with the longitudinal axis of the target ship. With such relative orientation, the ISAR system is in a position to process data based on rotation θ (FIG. 1B) of the target ship about its pitch axis.

As the target ship pitches, it rotates back and forth and θ varies as a function of time t in a somewhat sinusoidal manner as depicted in FIG. 1C.

Ignoring the motion of the ship pitch axis, as the bow of the target ship plunges into the water, some scatterers on the target ship move toward the ISAR and the radar returns from these scatterers have a doppler shift in one direction. Other scatters on the target ship are, during this portion of angular movement, moving away from the ISAR and the radar returns from such other scatterers have a doppler shift in the opposite direction. Differences in the magnitude and direction of doppler shift, in combination with differences in range, provide the basis for the ISAR to resolve scatterers in the course of generating an ISAR image.

The peaks of the graph of FIG. 1C correspond to the points at which the magnitude of the target ship's angular velocity is zero. When, as is generally the case, the angular motion of the ship is basically a sinusoidal function of time, the ship has a local maximum angular rate (MAR) at approximately the midpoint in time between the peak angular excursions. Two other points are indicated in FIG. 1C, each labeled MAR/2. At each of these points, the magnitude of the target ship's instantaneous angular velocity is one-half the intervening local maximum value. For sinusoidal angular motion, the time interval between these points is approximately two-thirds (⅔) of the time from one peak excursion to the opposite peak excursion. It is highly desirable to utilize (as a batch) the enormous quantity of data that can be collected during such a relatively long interval to provide an ISAR image. As explained more fully below, an ISAR system embodying this invention, because it is organized to compensate for non-uniformity in the magnitude of the target ship's angular velocity, is capable of doing so.

With reference to FIG. 2, there will now be described an ISAR system 1 embodying preferred features of this invention. An antenna 3 is connected to a duplexer 5. Radar pulses generated in a transmitter 7 propagate through duplexer 5 to antenna 3 to be radiated toward a target. A receiver 9 is connected to duplexer 5 which protects the receiver from the high energy transmitted pulses and, during ensuing reception intervals between transmitted pulses, propagates radar return signals to receiver 9. Suitably, and in accord with conventional practice in the radar art, the system includes a master timer 11 that controls the operating radio frequency (RF) and pulse repetition frequency (PRF) of transmitter 7. The master timer 11 also supplies a reference frequency to a mixer 13 within the receiver. The output of mixer 13 and a reference signal from master timer 11 are supplied to a synchronous detector 15 within the receiver so that the synchronous detector 15 produces an in-phase signal (I) and a quadrature-phase signal (Q). The I and Q signals are analog signals and bear a relationship to each other that provides a basis for determining the phase of the radar return signal relative to a reference phase. As is well known in the radar art, such I and Q signals can be produced by utilizing a transmitter that produces coherent pulses. Such I and Q signals can also be produced by arranging the master timer 11 so as to utilize coherent-on-receive techniques.

An analog-to-digital (A/D) converter unit 17 responds to the I and Q analog signals and to a sampling signal SS supplied by master timer 11 to produce sampled digital signals SI and SQ. As is well known in the radar art, such a sampling signal defines a succession of range bins after each transmitted pulse. To meet requirements for good resolution of the ISAR image (produced on an ISAR display device 20), it is suitable to operate the transmitter at a 1 KHz PRF, and to sample at a rate defining 500 range bins during each ensuing reception interval. It will be appreciated that such suitable operating parameters are exemplary and subject to choice dictated by well known principles in designing an ISAR system. It will also be appreciated that well known principles in designing ISAR systems, including those concerning pulse compression for high resolution ranging, and those concerning ISAR-to-target centroid range rate compensation, are applicable to an ISAR system embodying this invention, but that to discuss such well-known matters here would not further the explanation of the construction and operation of this invention. Thus, within the context of this invention, such matters as choice of radar RF operating frequency, radar PRF, techniques of achieving coherence, and the like, are subordinate to a more important point that the SI and SQ signals have a timing format that is a serial representation of a two-dimensional array of information. That is, the SI and SQ signals are produced in timed coordination with a cyclical definition of a succession of range bins with each succession being associated with a respective pulse of a sequence of pulses transmitted during a data collection interval.

The ISAR system 1 further includes data recording means comprising a data recording sequencer 22 and a memory 24 that is coupled to sequencer 22 by an address bus and data bus 26. The data recording means uses the sampled signals SI and SQ to generate a collected-data matrix 30 that is indexed in two dimensions on the basis of regular increments of time. In the preferred embodiment, the collected-data matrix is indexed in one dimension on the basis of uniformly wide range bins, and, in another direction on the basis of uniform pulse intervals defined by the ISAR PRF. The data recording sequencer 22 suitably includes means operating in accord with conventional digital data processing techniques to generate addresses to apply to the address bus to identify locations in memory 24 in which the data recording sequencer 22 writes sampled signals that are supplied to the memory 24 via the data bus portion of bus 26. The addresses for the collected-data matrix identify matrix cells in accord with memory mapping such that each matrix cell of the collected-data matrix 30 is in one-to-one correspondence with and associated with a two-dimensional, wholly time-based, index comprising a pulse-identifying integer and a range-bin-identifying integer. Each such addressed matrix cell provides for storing a pair of signals (the sampled SI signal and the sampled SQ signal) to provide a record of the values successively defined by the sampled signals over a period of time.

Latent (i.e., not explicit) in each such pair of sampled signals is information about a phase-residue value. Such phase-residue value, if and when computed, is unambiguous only within limits set by a modulo basis of computation. A phase-residue value, determined by computing the arc tangent of the ratio of the value of the SQ signal to the value of the SI signal, is computed modulo 360°. Thus, the same phase-residue value of 1°, for example, ambiguously corresponds to each of a succession of phase-residue values-1°, 361°, 721°, etc., concerning the phase of the received signal, relative to any arbitrarily selected reference phase, for that range bin within the reception interval in which the received signal was sampled.

For simplicity of expression in further description of the collected-data matrix 30, it will be described in terms of rows and columns. With reference now to FIG. 4, these rows are labeled P1, P2, etc., to indicate that each row of this matrix corresponds to a respective one of the radar pulses in the sequence involved in the data collection interval. These columns are labeled RB1, RB2, etc., to indicate that each column of this matrix corresponds to a respective one of the succession of range bins. Each of matrix cell is defined at the intersection of a row and a column. The matrix cell at the intersection of row P1 and column RB1 stores sampled signals identified as $SI_{1,1}$ and $SQ_{1,1}$, with the subscript 1,1 indicating row 1, column 1. As a general expression, the matrix cell at the intersection of any row $P_t$ and any column $RB_n$ stores sampled signals identified as $SI_{t,n}$ and $SQ_{t,n}$.

It will be appreciated that the values of such pair of sampled signals are affected by many factors including noise, the number of scatterers in the particular range bin and the radar cross section of each such scatterer, and the range rate of each such scatterer. Each such range rate in turn depends on the magnitude of the target ship's angular velocity component and on the geometric relationship between the scatterers and an axis of rotation.

As to the matter of geometric relationship, an important factor in ISAR processing, with respect to any given scatterer on the pitching target, is the height of the scatterer above the pitch axis. The higher the scatterer is above the pitch axis, the more deviation there will be in the doppler shift it causes as the target pitches. Thus, the higher a scatterer is above the pitch axis, the more there is a tendency for the scatterer to drift from one doppler filter to the next. This undesirable drift from one doppler filter to the next would occur if angular rate changes sufficiently during the processing interval used to define the doppler filters. As explained above in describing prior art ISAR systems, short processing intervals have been used to prevent excessive smear in the ISAR image that would result from such filter-to-filter drift.

In contrast to the prior art, the ISAR system 1 uses the collected-data matrix to operate in a way that enables a longer doppler processing interval, or stated in equivalent terms, that enables use of a larger synthetic-aperture-angle to generate a more detailed and more easily interpreted image to be produced on the ISAR display device 20. To this end, the system 1 includes a matrix processor 35 that provides first and second data processing means that cooperate to use the collected-data matrix 30 first to produce a synthetic-aperture-angle record and, second, to produce a translated matrix that is indexed in one dimension on the basis of uniform increments of synthetic aperture angle. A doppler processor 39 provides a third data processing means for using the translated-data matrix to load a display buffer 41 to control the ISAR display device 20. In the course of producing the translated-data matrix, the matrix processor 35 cooperates with memory 24 to generate other matrices and records that are generally indicated in FIG. 2 and illustrated in more detail in FIGS. 5, et seq. These include an unwrapped-phase-history matrix that preferably, to conserve memory space, is generated in an unmodified form (matrix 45) and then modified (to matrix 45M), as more fully described below. The matrix processor 35 uses the modified unwrapped-phase-history matrix 45M to produce a covariance matrix 47, which in turn is used to produce an eigenvector record 49. The matrix processor 35 further produces a synthetic-aperture-angle record 51, and uses it and the collected-data matrix to produce the translated-data matrix 37.

With reference again to FIG. 4, broken lines are used to indicate the existence of many more matrix cells than are specifically shown in this drawing. Suitably, there are 500 columns in the matrix, one for each range bin. The number of rows expand during the data collection interval at a rate corresponding to the PRF. With a 1 KHz PRF, there will be 1000 rows added to the collected-data matrix every second of the data collection interval.

One of the preferred features of this invention that is involved in the ISAR system 1 is a feature that can be explained with reference to FIG. 1C. As mentioned above, the ship's angular velocity has a local maximum angular rate at or near the midpoint between two excursion peaks, and a change of approximately 86% of the ship's monotonically changing pitch angle typically occurs between the half-maximum rate points (MAR/2). It will be appreciated that using the data collected during this interval of monotonically changing pitch angle is highly advantageous for enhancing signal-to-noise ratio (SNR) and enhancing resolution. As will be explained with reference to the flow chart of FIG. 3, an outer loop operation is performed to bring the processing interval used for doppler processing into correspondence with this MAR/2 to MAR/2 interval. This outer loop can be considered as selecting a group of consecutive rows of the collected-data matrix for use in further processing. Within the outer loop, the processing flows through an inner loop that can be considered as selecting a group of columns of the collected-data matrix for use in further processing.

The selection of such group of columns is made on a basis directed to discriminating between a relatively few number of range bins that each contain a single dominant scatterer and the many other range bins that do not. In this connection, consider the following analysis that begins by stating how the values of sampled data signals in the matrix cells depend on controlling independent variables. In this statement the SI and SQ values are treated as real and imaginary components of a complex number x(t):

$$x(t) = \sum_{k=0}^{K} \sigma(k) \exp[j \phi(t, k)]$$

where x(t) is the complex reflection at time t;

$\sigma$ (k) is the radar cross section of the kth scatterer;

k is the scatterer index; and $\phi$ (t,k) is the phase of scatterer k at time t In processing the collected-data matrix it is desirable to determine the phase of scatterer k at time t, i.e., $\phi$ (t,k). As a step toward that end, it is desirable to identify range bins that each contain a single dominant scatterer. By allocating index k =0 to the largest scatterer and defining reference values $\sigma=\sigma$ (0) and $\sigma$ (t) =$\sigma$ (t,0) to enable the contribution of the largest scatterer to be factored out of the foregoing sum, then by taking the natural logarithm of both sides of the foregoing equation, it can be seen that the phase (t) is a portion of the imaginary part of the natural logarithm of the row complex data in the collected-data matrix, and that the remaining portion of that imaginary part, due to perturbations of other scatterers, has the same statistical properties as such perturbations on the real part of the natural logarithm of the row complex data. Each of a few range bins that are most affected by a respective single dominant scatterer will therefore have not only the lowest phase variance but also the lowest log magnitude variance, which is identified herein as W(n) and given by:

$$W(n) = \frac{1}{T} \sum_{t}^{T} Re\{\ln[x(t, n)]\}^2 - \left\langle \frac{1}{T} \sum_{t}^{T} Re\{\ln[x(t, n)]\} \right\rangle^2$$

where n is the range-bin-identifying integer;

t is the pulse identifying integer;

each summation is carried out a column at a time with t being the index of summation;

T is the total number of rows used in the summation; and

Re means real part of.

As will be explained more fully in connection with the description of the flow chart of FIG. 3, the matrix processor 35 processes data in the collected-data matrix on a range-bin by range-bin basis to generate a variance array 53, illustrated in FIG. 5, having array cells containing W(1), W(2), etc. Any array cell, n, whose log magnitude variance W(n) is greater than either neighbor W(n−1) or W(n+1) is associated with a range bin having data inconsistent with there being a single dominant scatterer in the range bin. Such range bins are rejected as candidates for further processing. From among the remaining range bins not so rejected, a small group, having the lowest log magnitude variance W are selected as candidates.

The matrix processor 35 uses such candidate range bins to generate the unmodified unwrapped-phase-history matrix, which, as illustrated in FIG. 6 has rows $P_l$ to $P_{l+m}$ and columns S1 through S12 and data entries the general case of which is designated herein as φ (Si,j). The value of each of these entries is affected by noise and numerous other factors. The assumed relationship between unwrapped or relative phase and such other factors is as follows:

$$\Phi(n.t) = \psi(t) + \beta(n) + d(n)\theta(t)$$

where

ψ (t) is the phase of the ISAR focal point at time t;

β (n) is the arbitrary phase of scatterer n;

d(n) is the azimuth distance from scatterer n to the focal point (pitch axis); and θ (t) is the synthetic aperture angle at time t.

In order for the data in the unmodified unwrapped-phase-history matrix to be consistent with a least-squared-error fit to the foregoing relationship, the following other relationships must exist:

$$\beta(n) = \frac{1}{T} \sum_t^T \phi(n, t)$$

$$\psi(t) = \frac{1}{N} \sum_n^N \{\phi(n, t) - \beta(n)\}$$

The matrix processor 35 determines β (n) and ψ (t), then subtracts them from the unmodified matrix 45 (FIG. 6) to produce the modified matrix 45M (FIG. 7) having entries given by φ (n,t) θ (t). (It should be understood that the value of each of these entries is affected by noise.)

Each term β (n) [i.e., β (1) to β (12)] is determined by computing the mean (or average) of the respective column S1 to S12. Each term ψ (t) is similarly computed, albeit a row at a time.

The matrix processor 35 uses the modified unwrapped-phase-history matrix 45M (FIG. 7) to produce the covariance matrix 47 (FIG. 8) with entries:

$$C(n, m) = \sum_t^T \hat{\phi}(n, t) \hat{\phi}(m, t)$$

Furthermore, in order to achieve a least squares error fit to the model, d(n) must be the eigenvalue corresponding to the maximum eigenvalue of the covariance matrix, C(n,m). The matrix processor uses the covariance matrix to produce the eigenvector record 49 corresponding to the maximum eigenvalue, using well-known techniques based on principles set out in various textbooks, including *Linear Algebra*, by Hoffman and Kunze, published in 1971 by Prentice Hall. The eigenvector record provides values for d(n) to enable determination of θ (t), i.e., the synthetic-aperture-angle record 51, from the d(n)θ (n,t) entries in the modified unwrapped-phase-history matrix (FIG. 7). This determination is made in sequential processing steps. First, processing of the eigenvector d(n) determines a value V, given by:

$$V = \sum_n^N d(n)^2$$

Then, further processing yields the synthetic-aperture-angle record, in accord with:

$$\theta(t) = \frac{1}{V} \sum_n^N \hat{\phi}(n, t) d(n)$$

Figure 3:
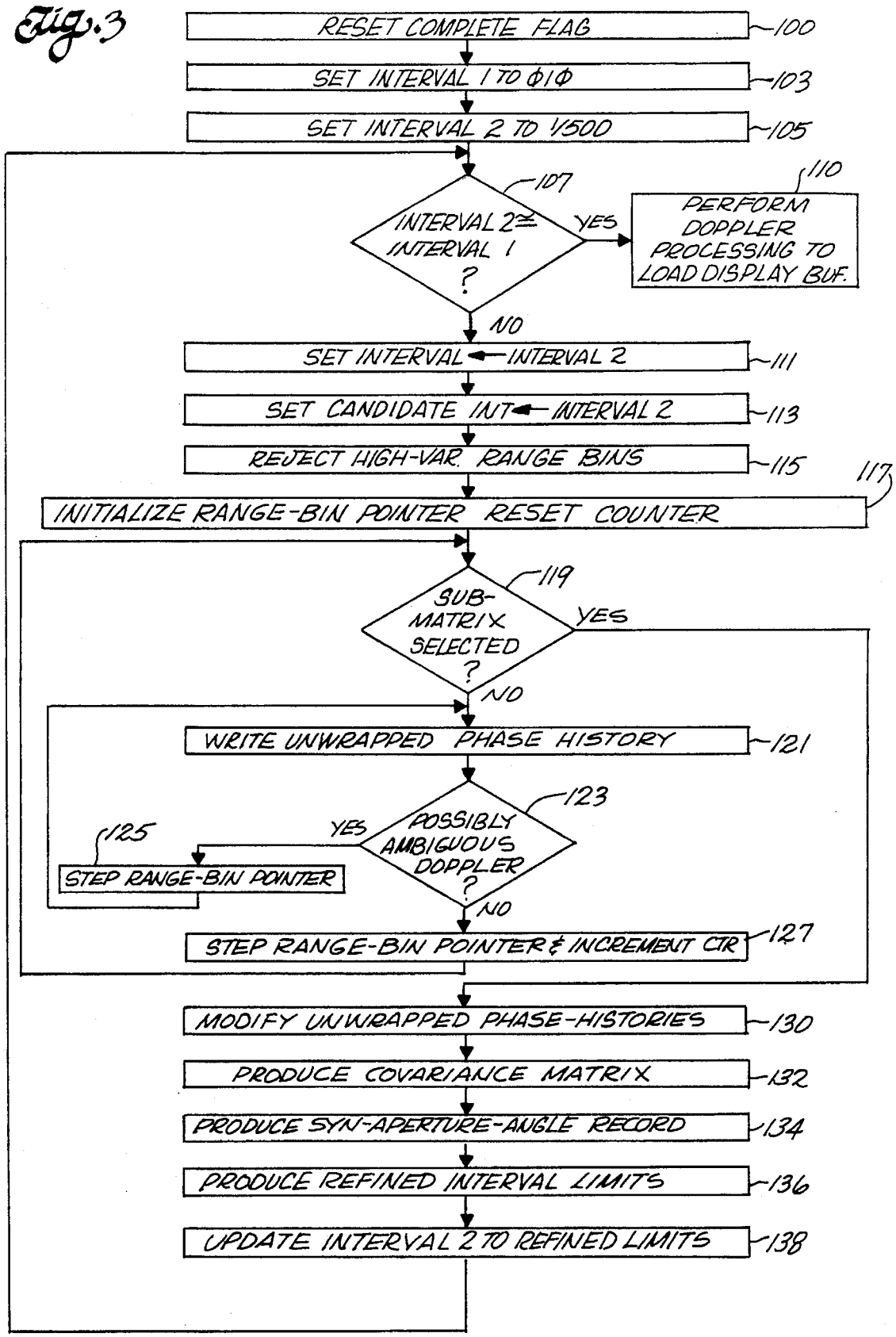
FIG. 3 is a flow diagram of operation of the ISAR system of FIG. 2.
Figure 10:
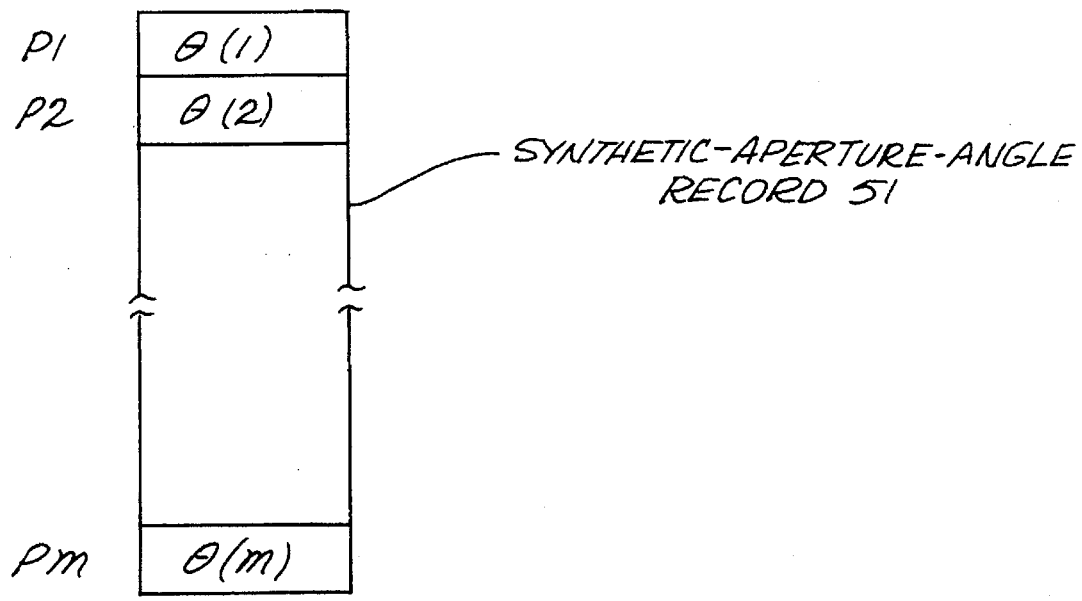
Figure 11:
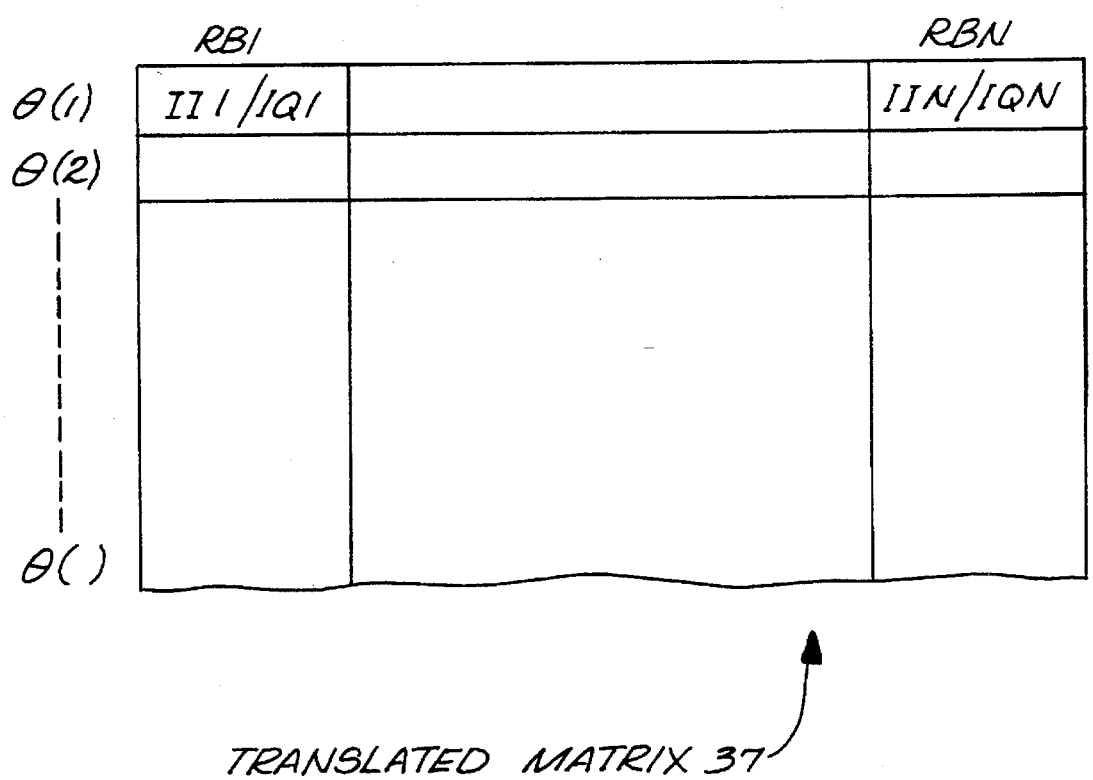

With reference now to the flow chart of FIG. 3, the flow of operations briefly summarized above will be amplified upon. At the outset of the flow of operations, as indicated in block 100, the matrix processor resets an "interval-select-complete flag," i.e., a logical control variable stored in memory 24 for use in controlling flow of operation. While the complete flag remains reset, the flow of operation is directed to determining a processing interval to use in doppler processing. When that interval is determined, this interval-select-complete flag is set, and the flow of operation branches to provide for operations including doppler processing and rewriting of the display buffer.

Immediately after block 100, the matrix processor, at block 103, executes an assignment statement that sets a variable Interval1 to 0/0. This variable is stored in memory 24, first with an initialized or reset value, and is updated on each pass through the outer loop, as described below, to keep a record of an immediately-preceding candidate interval. Next, at block 105, the matrix processor executes an assignment statement that sets a variable Interval1 to an arbitrarily selected interval starting at pulse integer 1 and ending at pulse integer 500.

Next, matrix processor 35 executes a comparison test at block 107 to determine whether Interval2 is approximately equal to Interval1, and, if so, to set the interval-select-complete flag. Plainly, the first pass through the outer loop is assured because of the differences in the initial settings made in blocks 103 and 105. A suitable threshold for this comparison is 3%; that is, when on successive passes through the outer loop Interval2 overlaps Interval1 by at least 97%, then flow branches out of the outer loop to block 110, where doppler processing is performed. On at least the first pass through block 107, the flow proceeds to block 111 where matrix processor 35 updates the variable Interval1 by an assignment statement setting it equal to Interval2. Next, in block 113, the matrix processor 35 executes an assignment statement to set another variable, referred to herein as a candidate interval, to be equal to Interval2. Thus, in the first pass through the outer loop, the candidate interval extends from pulse 1 through pulse 500, corresponding to a data collection interval of one-half second at a 1 KHz PRF.

Next, at block 115, the matrix processor uses the data in all the range bins within the applicable rows (1 to 500 for the first pass) to produce the log magnitude variance record (FIG. 5) as described above, and to reject the high-variance range bins. The matrix processor 35 generates a list of non-rejected range bins and stores this list in memory 24 for use in stepping a range-bin pointer as described below. It should be noted that this list will contain non-consecutive range-bin-identifying integers. This is so at the outset because every range bin having a higher variance than either of its neighbors is immediately rejected in block 115.

Next, in block 117, the matrix processor initializes the range-bin pointer in accord with the first entry in the stored list of non-rejected range bins, and resets a counter used to keep track of how many range bins have been selected.

Next, the matrix processor in block 119 executes a comparison operation to determine whether the sub-matrix has been completely selected. It does so by comparing the previously-reset counter with the desired number of range bins, here 12 range bins.

In each of at least 12 passes through block 119, the matrix processor 35 proceeds to a block 121, at which point the matrix processor produces an unwrapped-phase-history for the range bin to which the range-bin pointer, currently points. Preferably, the matrix processor in block 123 conducts a check to determine whether a possibly ambiguous doppler is involved. It is preferable to reject range bins whose dominant scatterer has a doppler frequency in the neighborhood of half the system PRF. To this end, matrix processor computes the pulse-to-pulse phase difference $D(n,t)$ in the candidate range bin as follows:

$$D(n,t)=ARG[x(n,t+1)x(n,t)^*]$$

where $x(n,t)^*$ is the complex conjugate of $x(n,t)$, or equivalently, $SI(n,t)-j\, SQ(n,t)$.

If the magnitude of this phase difference, i.e., $D(n,t)$ is sufficiently low, there is no need to reject. The guard band is suitably based on the corresponding entry in the variance record. Thus, $$\text{if } |D(n,t)| < \pi - 3[2W(n)]^{1/2}$$

for all t, then $$\Phi(n,0)=0 \text{ and } \Phi(n,t+1)=\Phi(n,t)+D(n,t)$$

If a possibly ambiguous doppler is found, the flow proceeds to block 125, otherwise to block 127. In block 125, the matrix processor 35 steps the range-bin pointer to select a different candidate range bin from the list, then loops back to block 121. In block 127, the matrix processor steps the range-bin pointer and increments the counter because another column has been added to the sub-matrix, then loops back to block 119.

After the counter reaches 12, the flow proceeds from block 119 to a block 130 at which point the matrix processor modifies the unwrapped-phase-histories. As described above, this operation entails processing to produce row and column mean averages and subtracting so that the entries in the modified matrix concern the $d(n)\theta(t)$ products.

Next, the matrix processor proceeds to block 132, at which point the matrix processor produces the covariance matrix, as described above. Next, in block 134, the matrix processor 35 sequentially uses the 12×12 covariance matrix 47 and the modified matrix 45M to produce the synthetic-aperture-angle record 51. The snythetic-aperture-angle record 51 is used, in block 134, to produce a translated data matrix 37 from collected data matrix 30 in FIG. 2, according to a well-known data interpolation product such as described in Numerical Analysis and Computation: Theory and Practice, by E. K. Blum, published in 1972 by Addison-Wesley.

As stated above, the first pass through the outer loop involves an arbitrarily selected interval extending for 500 pulses. It is preferable to identify an interval that embraces a local maximum angular rate and extends between the two points at which the angular rate is one-half that local maximum. Accordingly, in block 136, the matrix processor processes the synthetic-aperture-angle record in accord with well known curve fitting techniques to extrapolate and produce refined interval limits as an estimate of the points defining the desired processing interval. A textbook setting forth such well-known techniques is *Numerical Analysis and Computation: Theory and Practice*, by E. K. Blum, published in 1972 by Addison-Wesley. Next, in block 138, the matrix processor 35 updates the Interval2 variable to store the refined limits, and then loops back to block 107. Upon determining convergence in block 107, the flow proceeds to block 110, as stated above.

It should be appreciated that the inner loop and the outer loop cooperate to result in the identification of a processing interval that is particularly desirable for an ISAR system. There are significant advantages arising from the rejection of range bins containing possibly ambiguous doppler frequencies and arising from the identification of a substantially longer processing interval (involving monotonic target ship motion) than the short processing intervals selected on a completely arbitrary, input-data independent basis, as in the prior art.

What is claimed is:

1. An inverse synthetic array radar system organized to compensate for non-uniformity in the magnitude of the angular velocity of a rotating target as the target rotates to generate the synthetic-aperture-angle, the system comprising:

transmitter means for transmitting toward the target a sequence of radar pulses during a data collection interval;

receiver means for producing in-phase and quadrature-phase signals based on radar return from the target;

signal converter means for converting the in-phase and quadrature-phase signals to sampled signals;

data recording means for using the sampled data signals to generate a collected-data matrix indexed in each of two dimensions on the basis of regular increments of time;

first data processing means for processing the collected-data matrix to produce a synthetic-aperture-angle record indexed on the basis of regular increments of time;

second data processing means for using the collected-data matrix and the synthetic-aperture-angle record to produce a translated data matrix indexed in a dimension on the basis of uniform increments of synthetic-aperture-angle;

display means; and third data processing means for using the translated data matrix to control the display means to generate an image of the rotating target.

2. A system according to claim 1, wherein the collected-data matrix is indexed by a range-bin-identifying integer in combination with a pulse-identifying integer, and wherein the first data processing means includes means for selecting from the collected-data matrix a sub-matrix by identifying a group of consecutive pulse-identifying integers together with a group of non-consecutive range-bin-identifying integers, and further includes means for processing the selected sub-matrix to produce an unwrapped phase history for each selected range-bin, and means for processing the unwrapped phase histories to produce the synthetic-aperture-angle record.

3. A system according to claim 2, wherein the selected sub-matrix contains, for each selected range-bin, data consistent with the selected range-bin containing a single dominant scatterer, and wherein the means for processing the unwrapped phase histories includes means for determining an off-focal-point distance value for each such dominant scatterer, and means for using each such distance value in processing the unwrapped phase histories to produce the synthetic-aperture-angle record.

4. A system according to claim 3, wherein the means for determining the distance values includes means for using the unwrapped phase histories to generate a covariance matrix, and means for using the covariance matrix to produce an eigenvector corresponding to the maximum eigenvalue defining the distance values.

5. A system according to claim 1, wherein the signal converter means, after each radar pulse is transmitted, operates at a sampling rate that defines a succession of range-bins, and wherein the data recording means includes a memory and memory accessing means, the memory providing a multiplicity of matrix cells, and the memory accessing means operating in timed coordination with the signal converter means to write into each of the matrix cells both a sampled in-phase signal and a sampled quadrature-phase signal to generate the collected data matrix and enable retrieval from each such matrix cell on the basis of an index comprising a range-bin-identifying integer and a pulse-identifying integer; and wherein the second data processing means includes means for retrieving such sampled signals from such matrix cells, and processing means for producing interpolated in-phase and quadrature-phase signals for storage in the translated data matrix.

6. A system according to claim 5, wherein the first data processing means includes means for selecting from the collected-data matrix a sub-matrix by identifying a group of consecutive pulse-identifying integers together with a group of non-consecutive range-bin-identifying integers, and further includes means for processing the selected sub-matrix to produce an unwrapped phase history for each selected range-bin, and means for processing the unwrapped phase histories to produce the synthetic-aperture-angle record.

7. A system according to claim 6, wherein the means used to produce the unwrapped phase histories includes means for retrieving, from each matrix cell of the selected matrix, the sampled in-phase and sampled quadrature-phase signals stored therein, and means responsive to the retrieved signals for determining a separate unwrapped-phase value for each such selected matrix cell, and means for using the determined unwrapped-phase values to generate the unwrapped-phase histories as a phase-history matrix in the memory.

8. A system according to claim 7, wherein the means for processing the unwrapped phase histories includes means for processing the phase-history matrix to determine a plurality of time-dependent phase values all relating to the same focal point, and a plurality of time-independent phase values relating to respective range-bins, and means for using the time-dependent and time-independent phase values to provide a product matrix for use in producing the synthetic-aperture-angle record.

9. A system according to claim 8, wherein the product matrix contains data dependent upon an off-focal-point distance value for each of a plurality of dominant scatterers, and wherein the system includes within the product matrix data dependent upon off-focal-point distance value for each of a plurality of dominant scatterers, and where means for determining each such distance value and means for using each such distance to produce the synthetic-aperture-angle record.

10. A system according to claim 9, wherein the means for determining the distance values includes means for using the product matrix to generate a covariance matrix, and means for using the covariance matrix to produce an eigenvector defining the distance values.

11. A data processing subsystem for processing in-phase and quadrature-phase sampled digital signals produced within an inverse synthetic array radar system to provide input data for use in generating image data concerning a rotating target, the subsystem being organized to improve resolution in an image produced in accord with the image data and comprising:

means for recording the sampled digital signals to generate a collected-data matrix indexed in each of two dimensions on the basis of regular increments of time;

means for processing the collected-data matrix to produce a synthetic-aperture-angle record indexed on the basis of regular increments of time;

means for processing the collected-data matrix and the synthetic-aperture-angle record to produce a translated data matrix indexed in a dimension on the basis of uniform increments of synthetic-aperture-angle; and means for processing the translated data matrix to produce image data for generating the image.

12. A method of improving resolution in an image produced by an inverse synthetic array radar system in which in-phase and quadrature-phase sampled digital signals are produced during a data collection interval, the method comprising:

recording the sampled digital signals to generate a collected-data matrix indexed in each of two dimensions on the basis of regular increments of time;

processing the collected-data matrix to produce a synthetic-aperture-angle record indexed on the basis of regular increments of time;

processing the collected-data matrix and the synthetic-aperture-angle record to produce a translated data matrix indexed in a dimension on the basis of regular increments of synthetic-aperture-angle; and processing the translated data matrix to produce image data for generating the image.

13. A method according to claim 12, wherein the collected-data matrix is indexed by a range-bin-identifying integer in combination with a pulse-identifying integer, and wherein the processing of the collected-data matrix includes selecting from the collected-data matrix a sub-matrix by identifying a group of consecutive pulse-identifying integers together with a group of non-consecutive range-bin-identifying integers, and further includes processing the selected sub-matrix to produce an unwrapped phase history for each selected range-bin, and processing the unwrapped phase histories to produce the synthetic-aperture-angle record.

14. A method according to claim 13, wherein the selected sub-matrix contains, for each selected range-bin, data consistent with the selected range-bin containing a single dominant scatterer, and wherein the processing of the unwrapped phase histories includes determining an off-focal-point distance value for each such dominant scatterer, and using each such distance value in processing the unwrapped phase histories to produce the synthetic-aperture-angle record.

15. A method according to claim 14, wherein the determining of the distance values includes using the unwrapped phase histories to generate a covariance matrix, and using the covariance matrix to produce an eigenvector corresponding to the maximum eigenvalue defining the distance values.

16. A method according to claim 13, wherein the processing of the unwrapped phase histories includes processing the phase-history matrix to determine a plurality of time-dependent phase values all relating to the same focal point, and a plurality of time-independent phase values relating to respective range-bins, and using the time-dependent and time-independent phase values to provide a product matrix for use in producing the synthetic-aperture-angle record.

* * * * *